(12) United States Patent
Stangeland

(10) Patent No.: US 11,859,537 B2
(45) Date of Patent: Jan. 2, 2024

(54) GAS TURBINE ENGINE

(71) Applicant: TNS Teknologi, Hafrsfjord (NO)

(72) Inventor: Torleik Stangeland, Hafrsfjord (NO)

(73) Assignee: TNS TEKNOLOGI, Hafrsfjord (NO)

( * ) Notice: Subject to any disclaimer, the term of this patent is extended or adjusted under 35 U.S.C. 154(b) by 0 days.

(21) Appl. No.: 17/775,554

(22) PCT Filed: Nov. 10, 2020

(86) PCT No.: PCT/NO2020/050275
§ 371 (c)(1),
(2) Date: May 9, 2022

(87) PCT Pub. No.: WO2021/096366
PCT Pub. Date: May 20, 2021

(65) Prior Publication Data
US 2022/0397056 A1    Dec. 15, 2022

(30) Foreign Application Priority Data

Nov. 11, 2019  (NO) .................................... 20191333

(51) Int. Cl.
| | | |
|---|---|---|
| *F02C 3/073* | (2006.01) | |
| *F02C 3/05* | (2006.01) | |
| *F02C 3/10* | (2006.01) | |
| *F02C 7/36* | (2006.01) | |

(52) U.S. Cl.
CPC ................ *F02C 3/073* (2013.01); *F02C 3/05* (2013.01); *F02C 3/103* (2013.01); *F02C 7/36* (2013.01)

(58) Field of Classification Search
CPC .. F02C 3/05; F02C 3/064; F02C 3/073; F02C 3/103; F02C 7/36
See application file for complete search history.

(56) References Cited

U.S. PATENT DOCUMENTS

| | | |
|---|---|---|
| 2,428,330 A | 9/1947 | Heppner |
| 2,587,057 A | 2/1952 | McVeigh |
| 2,589,239 A * | 3/1952 | Fallon ...................... F02C 3/05 |
| | | 415/117 |
| 2,639,583 A | 5/1953 | Steele |
| 3,037,348 A | 6/1962 | Gassmann |

(Continued)

FOREIGN PATENT DOCUMENTS

| | | |
|---|---|---|
| DE | 10348613 A1 | 7/2005 |
| GB | 588092 A | 5/1947 |

(Continued)

OTHER PUBLICATIONS

NO 20191333; Search Report; dated Jun. 11, 2020; 2 pages.
PCT/No. 2020/050275, International Search Report and Written Opinion; dated Jan. 29, 2021, 12 pages.

*Primary Examiner* — Steven M Sutherland
(74) *Attorney, Agent, or Firm* — Kilpatrick Townsend & Stockton LLP

(57) ABSTRACT

A gas turbine engine comprises at least a power output turbine unit (POT), which is rotatably arranged inside an outer housing unit, and a compressor-turbine unit (CTU), which is rotatably arranged inside the POT, and the CTU, POT and outer housing unit are arranged about a common axis of rotation (CL). The POT and the CTU are arranged in such close proximity (d) that a dynamic friction coupling is generated between the POT and the CTU.

20 Claims, 5 Drawing Sheets

(56) References Cited

U.S. PATENT DOCUMENTS

| | | | | |
|---|---|---|---|---|
| 3,037,352 A | * | 6/1962 | Pavlecka | F02C 3/05 |
| | | | | 60/39.35 |
| 4,213,297 A | * | 7/1980 | Forster | F28D 9/0018 |
| | | | | 60/39.511 |
| 4,693,075 A | | 9/1987 | Sabatiuk | |
| 5,832,715 A | * | 11/1998 | Dev | F01D 5/282 |
| | | | | 60/39.511 |
| 6,397,577 B1 | | 6/2002 | Songergaard | |
| 6,430,917 B1 | | 8/2002 | Platts | |

FOREIGN PATENT DOCUMENTS

| | | |
|---|---|---|
| GB | 1201767 A | 8/1970 |
| GB | 2005355 A | 4/1979 |
| WO | 9613656 A1 | 5/1996 |
| WO | 0235072 A2 | 5/2002 |

* cited by examiner

GAS TURBINE ENGINE

TECHNICAL FIELD OF THE INVENTION

The invention concerns the field of gas turbines, and more specifically a gas turbine as specified by the preamble of claim 1.

BACKGROUND OF THE INVENTION

A gas turbine engine comprises in its most basic form a rotating gas compressor in which a gas (such as air) is compressed, a combustion chamber in which a fuel is added to the compressed air ignited to produce a high-velocity exhaust gas, and a downstream turbine arranged on the same shaft as the gas compressor and configured to be rotated by the exhaust gas. A shaft is commonly connected to the turbine, whereby the gas turbine engine may be used to drive a propeller, an electric generator or other utility components.

The air and other gases flowing through a gas turbine engine causes skin friction drag and irrecoverable turbulence. These factors contribute to reducing the engine efficiency to as low as 35% to 40%, the efficiency being the ratio of actual work output to the net input energy supplied in the form of fuel. As the various stages of a gas turbine engine normally are arranged along a common shaft, conventional gas turbine engines tend to be long and bulky.

It is therefore a need for a gas turbine engine which is more efficient and more compact that those of the prior art.

SUMMARY OF THE INVENTION

The invention is set forth and characterized in the main claim, while the dependent claims describe other characteristics of the invention.

It is thus provided a gas turbine engine, comprising at least a power output turbine unit (POT) which is rotatably arranged inside an outer housing unit, and a compressor-turbine unit (CTU) which is rotatably arranged inside the POT, and the CTU, POT and outer housing unit are arranged about a common axis of rotation.

In one embodiment, the POT comprises an output shaft which is configured to be arranged in a second opening in the housing, said output shaft configured for connection to a utility device. The POT further comprises a turbine section having a plurality of turbine blades arranged in the region of an open end portion of a channel and also comprises a circular portion forming a shaft about the central axis.

The POT further comprises a compressor housing section which comprises a cavity and orifices. The compressor housing section and the turbine section may be rigidly connected or mechanically connected via e.g. a gearbox.

The CTU comprises a compressor-turbine section and a turbine section, and the compressor-turbine section and the turbine section are interconnected by circular portion forming a shaft about the central axis.

The turbine section may be a radial turbine having turbines blades arranged upstream of an outlet duct and an orifice, and the compressor-turbine section may comprise turbine blades arranged upstream of an outlet duct and an opening.

In one embodiment, the CTU shaft, the inside of which forms the air inlet, is rotatably supported in the POT circular portion, forming between them a cavity configured for seals and bearings.

The turbine section may be rotatably arranged in the compressor housing section, such that air or other gases having passed the turbine blades of the first stage are ejected through the first outlet opening and the orifice, and into a combustion chamber formed by a portion of the housing wall and a portion of the circular portion.

The POT and the CTU are arranged in such close proximity that a dynamic friction coupling is generated between the POT and the CTU.

The invention is based on a concept of utilizing the friction generated between the rotating units to transfer torque. The invented gas turbine engine will have a lower internal power loss due to friction, because the friction is utilized to transfer torque. Another advantage is that the invention may eliminate the need for gearbox (to reduce RPM) and the associated power loss. The invented gas turbine engine produces a high torque at low RPMs and has a higher efficiency than prior art gas turbine engines.

In the invented gas turbine engine, the CTU may be able to rotate at a higher RPM range than prior art turbine units, because the POT rotates together with the CTU. Also, the air inlet channel is comparatively long and comprises a surface structure which promotes aerodynamic friction and between the CTU and POT. These features will contribute to improving the gas turbine engine efficiency.

BRIEF DESCRIPTION OF THE DRAWINGS

These and other characteristics of the invention will become clear from the following description of an embodiment of the invention, given as a non-restrictive example, with reference to the attached schematic drawings, wherein:

FIG. 2 illustrates an outer housing unit, FIG. 3 illustrates a power output turbine unit (POT), and FIG. 4 illustrates a compressor-turbine unit (CTU);

DETAILED DESCRIPTION OF EMBODIMENTS OF THE INVENTION

Figure 1:
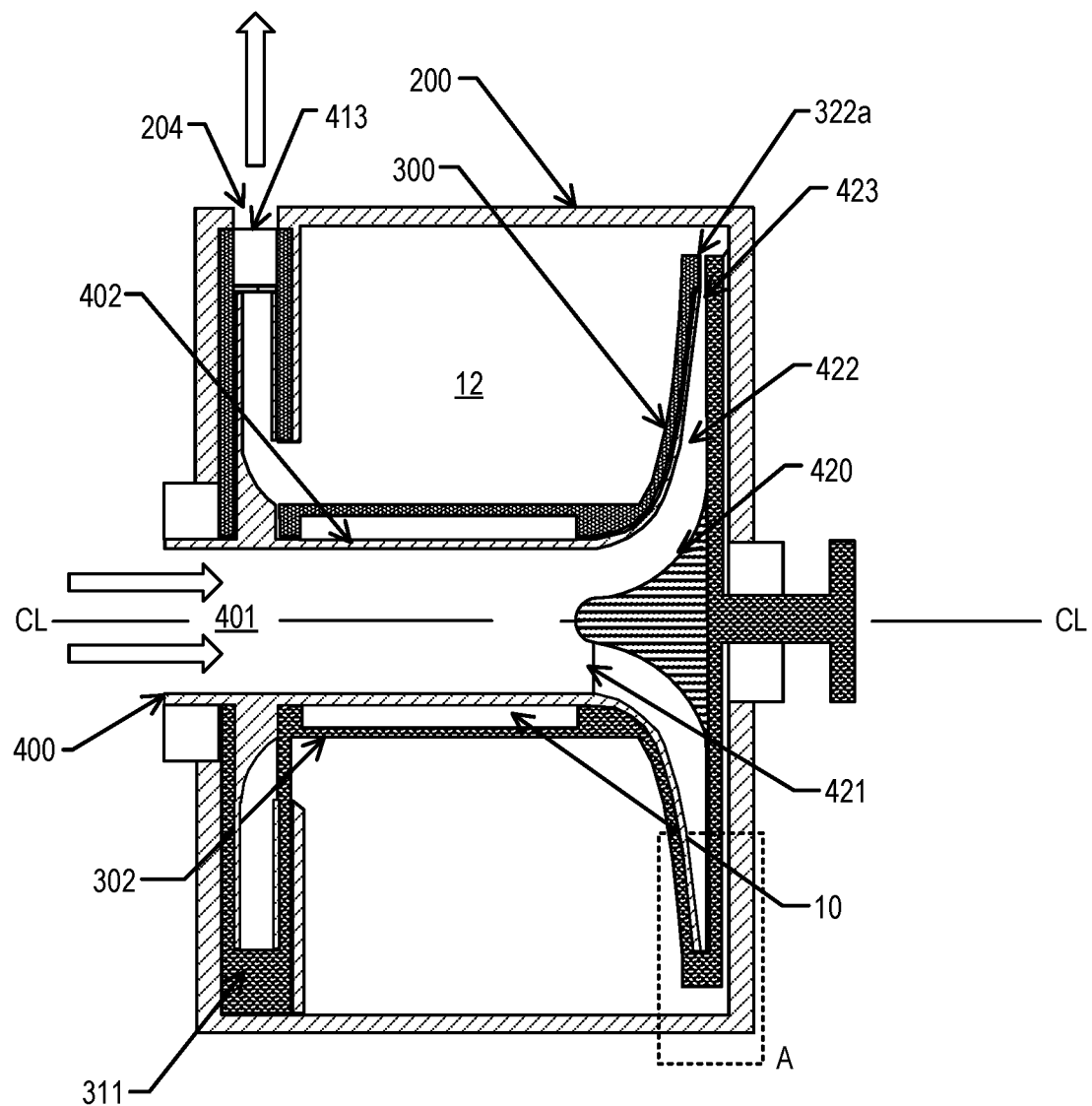
FIG. 1 is a sectional side view drawing, taken along the axis of rotation, of an embodiment of the gas turbine engine according to the invention, in an assembled state.

The following description may use terms such as "horizontal", "vertical", "lateral", "back and forth", "up and down", "upper", "lower", "inner", "outer", "forward", "rear", etc. These terms generally refer to the views and orientations as shown in the drawings and that are associated with a normal use of the invention. The terms are used for the reader's convenience only and shall not be limiting.

Referring initially to FIG. 1, the gas turbine engine according to the invention comprises in general the following three units, one nested within the other and arranged about a common axis of rotation CL: a power output turbine unit (POT) 300 which is rotatably arranged inside an outer housing unit 200, and a compressor-turbine unit (CTU) 400 which is rotatably arranged inside the POT 300. In the following, the compressor-turbine unit (CTU) is also referred to as first turbine unit 400, and the power output turbine unit (POT) is also referred to as a second turbine unit 300.

The housing 200 may be mounted on a vehicle, vessel or other foundation, using mounting assemblies (not shown) that are well known in the art. It should be understood that several parts (e.g. seals, fittings, bearings, control units, fuel supply) that generally are required in a gas turbine engine have been omitted from the drawings, as these parts are well known in the art and not required for illustrating the invention. By the same token, materials are not specified, as the skilled person will know which material qualities and properties are suitable for a gas turbine engine.

Figure 2:
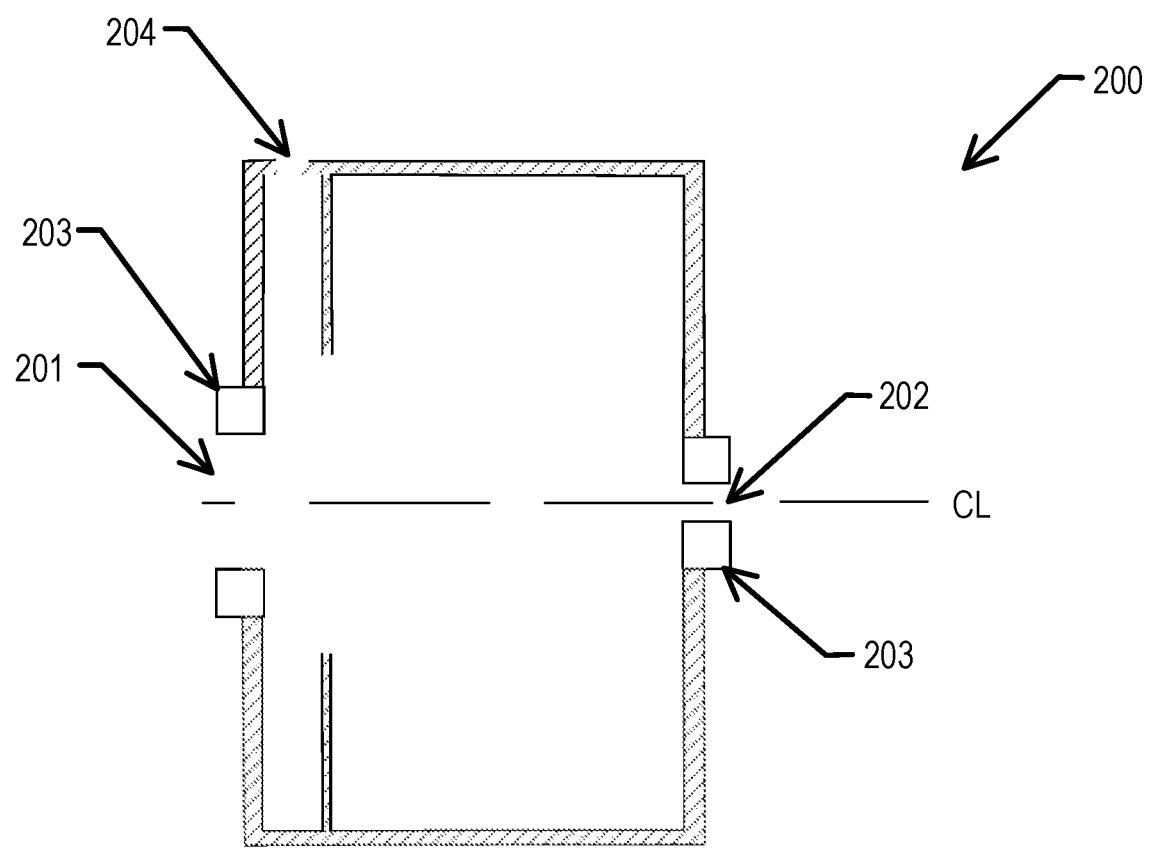
FIGS. 2, 3 and 4 are sectional side view drawings of the main units illustrated in FIG. 1; specifically.

Referring now to FIGS. 1 and 2, the housing 200 comprises a first opening 201 and a second opening 202, each provided with seals and bearings 203. Reference number 204 denotes a typical exhaust gas outlet.

Figure 3:
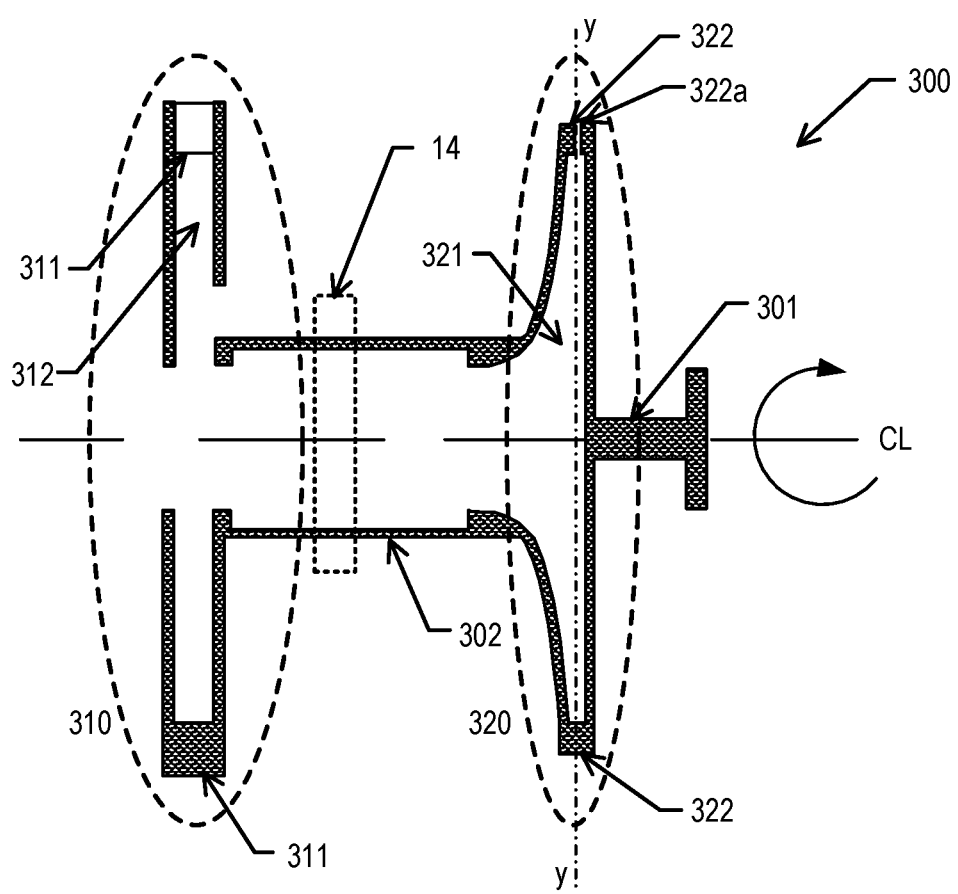

Referring now to FIGS. 1 and 3, the power output turbine unit (POT) 300 comprises an output shaft 301, which is configured to be rotatably arranged in the above-mentioned second opening 202 in the housing 200. The output shaft may be connected to a utility device, for example an aircraft propeller or fan, or an electric generator. The invention shall not be limited to such applications. The POT 300 also comprises a turbine section 310 (generally indicated by the dotted line 310 in FIG. 3 and hereinafter referred to as the "third stage"), which comprises a plurality of turbine blades 311 arranged in the region of an open end portion of a channel 312. A circular portion 302 forms a shaft about the central axis CL.

The POT 300 also comprises a compressor housing section 320 (generally indicated by the dotted line 320 in FIG. 3), which comprises a cavity 321 and orifices 322. Although the POT 300 is illustrated as one singular object in which the compressor housing 320 and the third stage 310 are rigidly connected, it should be understood that the compressor housing 320 and the third stage 310 may be mechanically connected via e.g. a gearbox 14, indicated schematically with dotted lines in FIG. 3.

Figure 6:
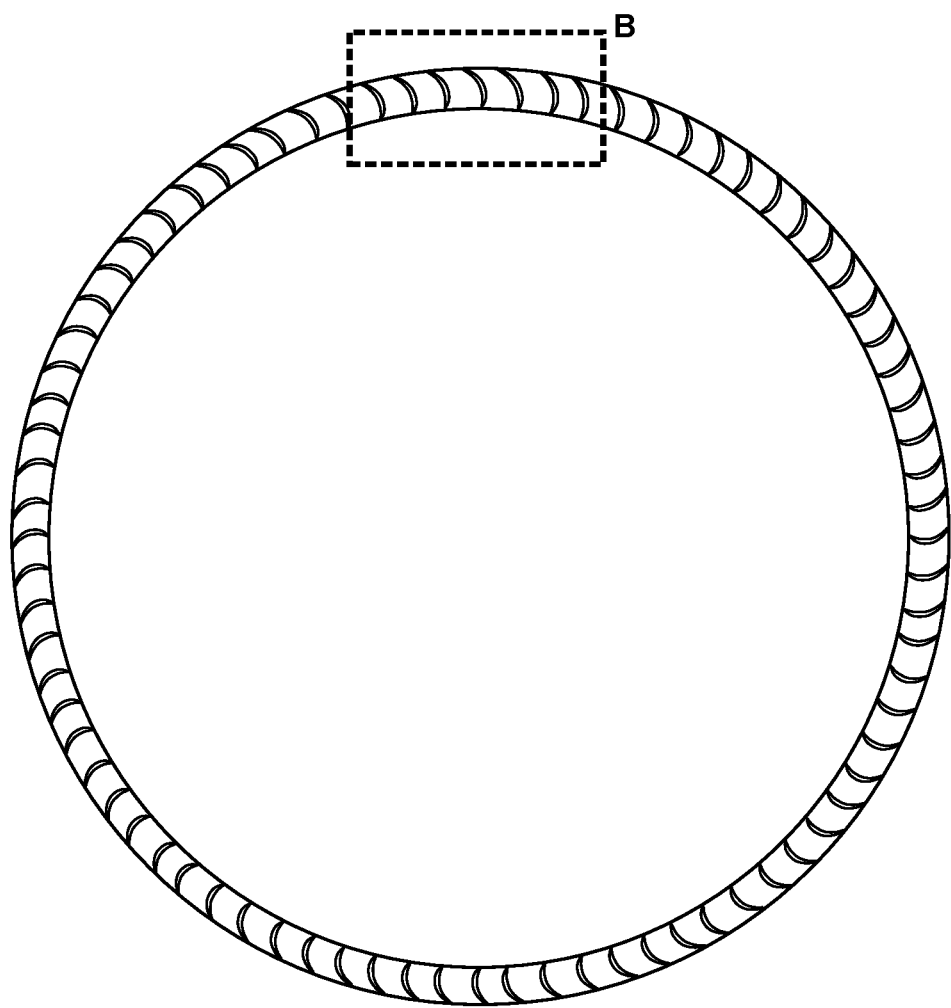
FIG. 6 is a plan view of the section y-y in FIG. 3.
Figure 7:
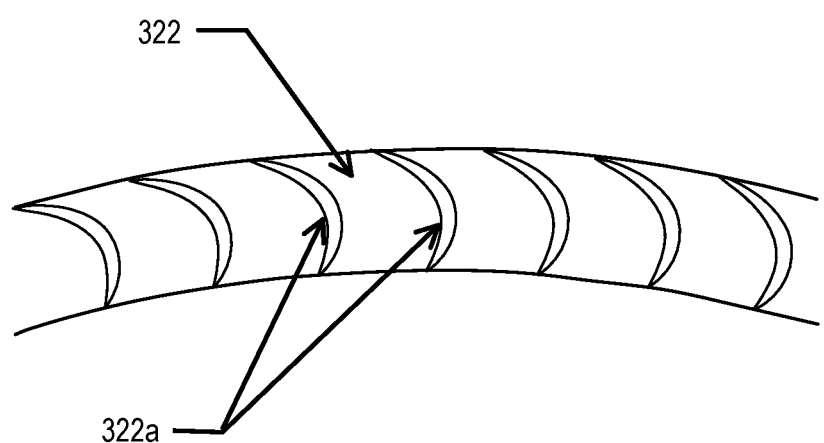
FIG. 7 is an enlarged view of the area "B" in FIG. 6.

As an option, turbine blades 322*a* may be installed in the housing section 320, whereby the orifices 322 are defined by the blades, see FIGS. 6 and 7.

Figure 4:
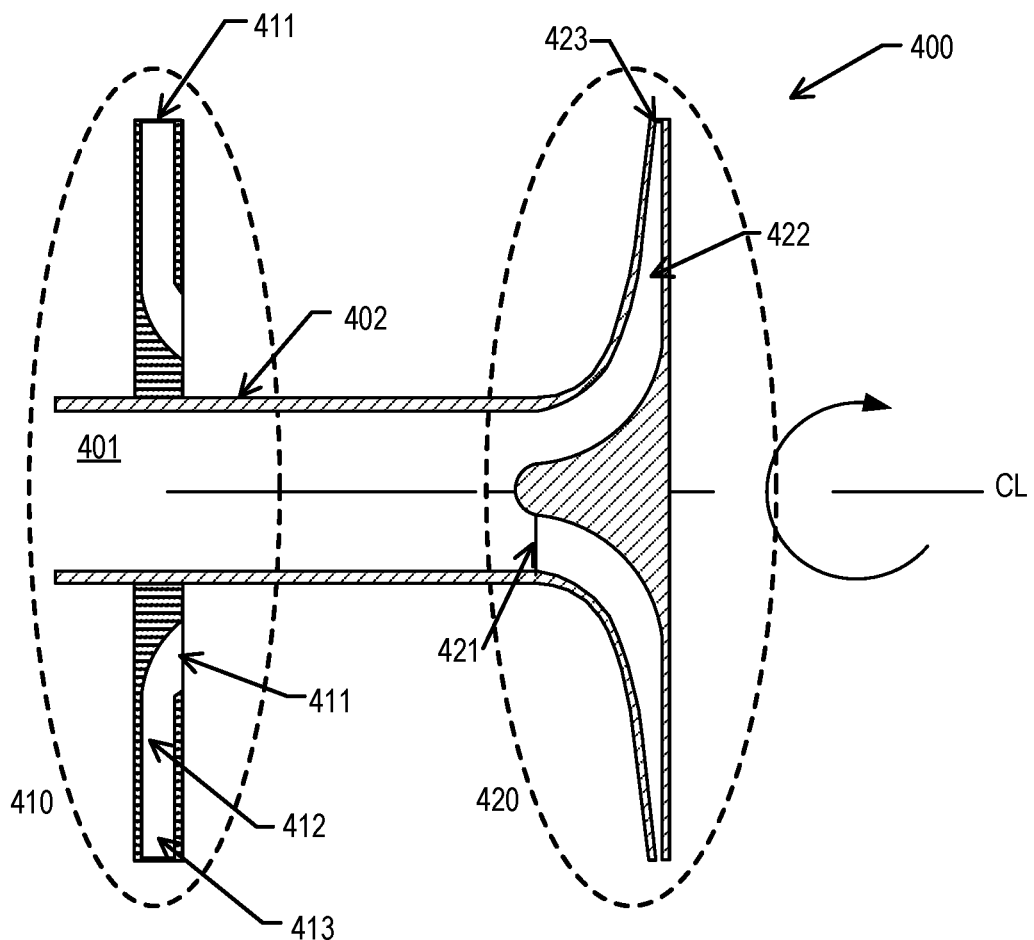

Referring now to FIGS. 1 and 4, the compressor-turbine unit (CTU) 400 generally comprises a compressor-turbine section 410 (generally indicated by the dotted line 410 in FIG. 4 and hereinafter referred to as the "second stage") and a turbine section 420 (generally indicated by the dotted line 420 in FIG. 4 and hereinafter referred to as the "first stage"). The first 410 and second 420 stages are interconnected by circular portion 402 forming a shaft about the central axis CL. Reference number 401 denotes a gas (air) inlet. In the illustrated embodiment, the first stage 420 is a radial turbine having turbines blades 421 arranged upstream of an outlet duct 422 and an orifice 423 between turbine blades. The second stage 410 comprises turbine blades 411 arranged such that an outlet duct 412 and opening 413 is formed between the blades.

Referring now to FIG. 1, the CTU 400 is rotatably arranged inside the POT 300. More specifically, the CTU shaft 402 (the inside of which forms the air inlet 401) is rotatably supported in the POT circular portion (shaft) 302, forming between them a cavity 10 into which seals and bearings (not shown) may be arranged. The first stage 420 is rotatably arranged in the compressor housing section 320, such that air (or other gases) having passed the turbine blades 421 of the first stage 420 are ejected through the first outlet opening 423 (between turbine blades) and the orifice 322, and into a combustion chamber 12 formed by a portion of the housing wall and a portion of the shaft 302. It should be understood that the combustion chamber may have other configurations. FIG. 1 also illustrates how the second stage 410 is rotatably arranged inside the third stage 310; in the channel 312.

When the gas turbine engine is operating, a gas (e.g. air) enters the inlet 401 in the CTU 400, as indicated by the arrows. Inside the CTU, the gas encounters the high-speed radial compressor in the first stage 420 and is given an increase in momentum and velocity and then ejected through the first orifices 423 and the second orifices 322, and into the combustion chamber 12. The combustion chamber is furnished with a fuel supply system of a known type and therefore not illustrated. The combusted gas is forced towards the exhaust gas outlet 204, and therefore passes—and imparts momentum to—the second stage blades 411 and the third stage blades 311.

Figure 5:
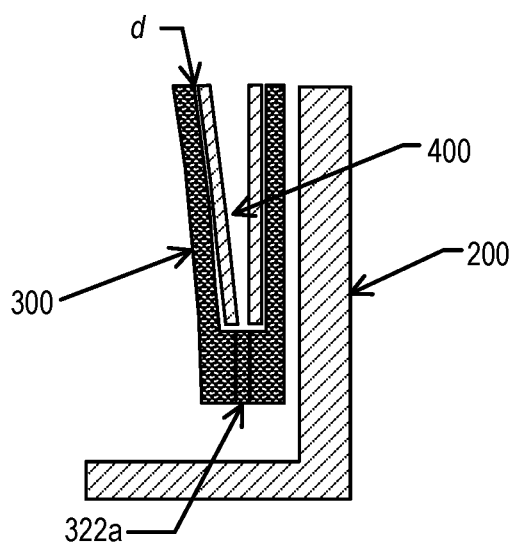
FIG. 5 is an enlarged view of the area "A" in FIG. 1.

The aerodynamic friction caused by and between the rotating POT 300 and CTU 400 will contribute to the output power and thus result in an increased efficiency of the gas turbine engine. More specifically, the close proximity between the POT 300 and the CTU 400 generates a dynamic friction coupling between the two units: the friction caused against the POT 300 by the rotating CTU 400 contributes to the rotation of the POT 300, and vice versa. This contributes to the output power and to an increase of efficiency. Referring to FIG. 5, it will be understood that the distance d between the POT 300 and the CTU 400 may be dimensioned according to the specific requirements. The inner surface area of the POT 300 and the outer surface area of the CTU 400 may also be configured and formed to optimize the friction coupling between the two units. For example, surfaces may (partly or completely) be provided with structures (e.g. ridges and grooves) that promote aerodynamic friction.

It should be understood that the gas turbines described above may be axial turbines, radial turbines, or a combination of both. The invention shall not be limited to the type of gas turbines.

In the embodiments described above, various features and details are shown in combination. The fact that several features are described with respect to a particular example should not be construed as implying that those features by necessity have to be included together in all embodiments of the invention. Conversely, features that are described with reference to different embodiments should not be construed as mutually exclusive. As a person skilled in the art readily will understand, embodiments that incorporate any subset of features described herein and that are not expressly interdependent have been contemplated by the inventor and are part of the intended disclosure. However, explicit description of all such embodiments would not contribute to the understanding of the principles of the invention, and consequently some permutations of features have been omitted for the sake of simplicity or brevity.

The invention claimed is:
1. A gas turbine engine, having a central axis of rotation (CL) and comprising at least:
   an outer housing unit having a first opening and a second opening and an exhaust gas outlet;
   a power output turbine unit (POT) comprising an output shaft and a first circular portion forming a first shaft about the central axis (CL), the POT rotatably arranged inside the outer housing unit, and comprising a compressor housing section and a third stage;
   a compressor-turbine unit (CTU), rotatably supported inside the POT, having (i) a first stage and (ii) a second stage rotatably arranged inside the third stage of the POT, wherein the first and second stages being interconnected by a second circular portion forming a second shaft about the central axis (CL), the second circular portion also forming an air inlet; and wherein:

a portion of the air inlet is rotatably supported by the first opening of the outer housing unit, the output shaft of the POT is rotatably supported by the second opening of the outer housing unit, a combustion chamber is formed by a portion of a wall of the outer housing unit and a portion of the first shaft, the first stage is rotatably arranged in the compressor housing section, such that air or other gases having passed the first stage are ejected into the combustion chamber, and the CTU, POT and outer housing unit are arranged about said central axis of rotation (CL).

2. The gas turbine engine of claim 1, wherein the output shaft of the POT is configured for connection to a utility device.

3. The gas turbine engine of claim 1, wherein the third stage comprises a plurality of turbine blades arranged in a region of an open end portion of a channel.

4. The gas turbine engine of claim 1, wherein the compressor housing section comprises a cavity and orifices.

5. The gas turbine engine of claim 1, wherein the compressor housing section and the third stage are rigidly connected or mechanically connected via a gearbox.

6. The gas turbine engine of claim 1, wherein the first stage comprises a radial turbine having turbines blades arranged upstream of a first outlet duct and an orifice, and the second stage comprises turbine blades arranged upstream of a second outlet duct and an opening.

7. The gas turbine engine of claim 1, wherein the CTU, an inside of which forms the air inlet, is rotatably supported in the first circular portion of the POT, forming between the air inlet and the first circular portion a cavity configured for seals and bearings.

8. The gas turbine engine of claim 1, wherein the first stage is rotatably arranged in the compressor housing section, such that air or other gases having passed turbine blades of the first stage are ejected through a first outlet opening and an orifice, and into the combustion chamber formed by a portion of the wall of the outer housing unit and a portion of the first circular portion.

9. The gas turbine engine of claim 1, wherein the POT and the CTU are arranged in such close proximity (d) that a dynamic friction coupling is generated between the POT and the CTU.

10. A system comprising:
an outer housing unit having a first opening, a second opening, and an exhaust gas outlet;
a power output turbine unit (POT) comprising an output shaft and a first circular portion forming a first shaft about a central axis (CL); and
a compressor-turbine unit (CTU) having (i) a first stage having a high-speed radial compressor, and (ii) a second stage, the first stage and the second stage being interconnected by a second circular portion forming a second shaft about the central axis (CL), the second circular portion also forming an air inlet, wherein:
the POT is rotatably arranged inside the outer housing unit, and comprises a compressor housing section and a third stage,
the CTU is rotatably supported inside the POT,
a combustion chamber is formed by a portion of a wall of the outer housing unit and a portion of the first shaft, and
the CTU, POT and outer housing unit are arranged about the CL.

11. The system of claim 10, wherein the first stage is rotatably arranged in the compressor housing section, such that air or other gases having passed the first stage are ejected into the combustion chamber.

12. The system of claim 11, wherein a portion of the air inlet is rotatably supported by the first opening of the outer housing unit, and the POT output shaft is rotatably supported by the second opening of the outer housing unit.

13. The system of claim 10, wherein the output shaft of the POT is configured for connection to a utility device.

14. The system of claim 10, wherein the third stage comprises a plurality of turbine blades arranged in a region of an open end portion of a channel.

15. The system of claim 10, wherein the compressor housing section comprises a cavity and orifices.

16. The system of claim 10, wherein the compressor housing section and the third stage are rigidly connected or mechanically connected via a gearbox.

17. The system of claim 10, wherein the first stage is a radial turbine having turbines blades arranged upstream of a first outlet duct and an orifice, and the second stage comprises turbine blades arranged upstream of a second outlet duct and an opening.

18. The system of claim 10, wherein the CTU, an inside of which forms the air inlet, is rotatably supported in the first circular portion of the POT, forming between the air inlet and the first circular portion a cavity configured for seals and bearings.

19. The system of claim 10, wherein the first stage is rotatably arranged in the compressor housing section, such that air or other gases having passed turbine blades of the first stage is ejected through a first outlet opening and an orifice, and into the combustion chamber formed by a portion of the wall of the outer housing unit and a portion of the first circular portion.

20. The system of claim 10, wherein the POT and the CTU are arranged in such close proximity (d) that a dynamic friction coupling is generated between the POT and the CTU.

* * * * *